United States Patent [19]
Ohtomo

[11] Patent Number: 5,663,946
[45] Date of Patent: Sep. 2, 1997

[54] OPTICAL DISC HAVING BUFFERING AREAS CAPABLE OF STORING A PATTERN FOR OBTAINING TRACKING ERROR SIGNALS AND RECORDING AND/OR REPRODUCING APPARATUS THEREFOR

[75] Inventor: Katsuhiko Ohtomo, Miyagi, Japan

[73] Assignee: Sony Corporation, Tokyo, Japan

[21] Appl. No.: 637,698

[22] PCT Filed: Aug. 25, 1995

[86] PCT No.: PCT/JP95/01699

§ 371 Date: Apr. 29, 1996

§ 102(e) Date: Apr. 29, 1996

[87] PCT Pub. No.: WO96/07179

PCT Pub. Date: Mar. 7, 1996

[30] Foreign Application Priority Data

Aug. 31, 1994 [JP] Japan ................... 6-207686

[51] Int. Cl.$^6$ .......................................... G11B 7/24
[52] U.S. Cl. ........................... 369/275.3; 369/58; 369/32
[58] Field of Search ........................ 369/275.3, 275.4, 369/275.2, 13, 58, 44.26, 14, 54, 56, 32

[56] References Cited

U.S. PATENT DOCUMENTS 4,879,704  11/1989  Takagi et al. ..................... 369/14
5,023,854  6/1991  Satoh et al. ..................... 369/58
5,247,494  9/1993  Ohno et al. ..................... 369/13
5,321,673  6/1994  Okazaki ..................... 369/275.2
5,521,900  5/1996  Ando et al. ..................... 369/275.3

FOREIGN PATENT DOCUMENTS

0232134B1  8/1994  European Pat. Off. .
62-285232  12/1987  Japan .
5-89602    4/1993  Japan .
5-159295   6/1993  Japan .

*Primary Examiner*—Tan Dinh
*Attorney, Agent, or Firm*—Limbach & Limbach LLP

[57] ABSTRACT

At the boundary between the program area and the recording area, buffering areas where no valid data exists are respectively provided in the program area and the recording area. These respective buffering areas are caused to be access inhibit area, and neither recording or reproduction is carried out in these areas. For this reason, oscillation of the tracking servo which is likely to take place when light spot is passed through the boundary between the program area and the recording area is suppressed to realize tracking servo stable at all times. Thus, temporary missing of information signals is prevented.

14 Claims, 6 Drawing Sheets

OPTICAL DISC HAVING BUFFERING AREAS CAPABLE OF STORING A PATTERN FOR OBTAINING TRACKING ERROR SIGNALS AND RECORDING AND/OR REPRODUCING APPARATUS THEREFOR

TECHNICAL FIELD

This invention relates to an optical disc such as a magneto-optical disc, etc., and more particularly to an optical disc including a recording area and a program area (premastered area) within the disc surface and a recording and/or reproducing apparatus for such optical disc.

BACKGROUND ART

In order to cope with requirements of miniaturization and/or high density recording with respect to magneto-optical disc in recent years, so called hybrid media each including a recording area and a program area (premastered area) within a single disc surface have been devised at present.

In such hybrid media, the program area is comprised of emboss pits, and the recording area is comprised of wide grooves. At the innermost circumferential portion of each of the hybrid media, lead-in area where TOC information corresponding to table of contents of recorded information is recorded is provided.

The configuration of such hybrid media is adopted in various magneto-optical discs.

Meanwhile, in the magneto-optical disc, the three-beam method is employed as a method of obtaining tracking error signal thereof.

As shown in FIGS. 1 to 3, this three-beam method is a method in which main beam spot B for reading signal and sub-beam spots A, C spaced by a predetermined distance in track width direction before and after the main beam spot B are used to obtain a tracking error signal. In the three-beam method, the state where the main beam spot B is directly above the track T as shown in FIG. 1 is the most preferable state. In this state, areas of the portions where the sub-beam spots A, C cross (are laid across) the track T are the same, resulting in output of 0. Moreover, when the main beam spot B deviates (is shifted) slightly to the left side as shown in FIG. 2, the area of the portion where the sub-beam spot C crosses (is laid across) the track T is greater than that of the sub-beam spot A, resulting in output of positive value. Further, when the main beam spot B deviates (is shifted) slightly to the right side as shown in FIG. 3, the area of the portion where the sub-beam spot A crosses (is laid across) the track T is greater than that of the sub-beam spot C, resulting in output of negative value. In this way, track deviation of the main beam spot B is detected. Thus, correction is implemented in dependency upon output value corresponding thereto.

However, in the case of obtaining a tracking error signal of the hybrid media by the three-beam method, since, in the hybrid media, as described above, the program area is comprised of emboss pits and the recording area is comprised of wide grooves on the disc surface thereof, there is the possibility that phase of the tracking error signal is changed by 180 degrees (rotated) when light spot is passed through the boundary between the program area and the recording area. Accordingly, great acceleration is applied to the optical pick-up at this time, so an object lens (objective) is vibrated in the inner circumferential direction or in the outer circumferential direction by inertia. For this reason, the tracking servo may be in oscillated state. In addition, such vibration would affect the focus servo as well. As a result, response of the focus servo is lowered. Thus, there may take place the worst state where the entirety of the system is stopped. In this case, for recovery (restoration), a certain time is required. When viewed from end user, missing of information would temporarily take place.

Moreover, in the optical disc, so called CLV system is ordinarily employed. For this reason, a rotation synchronizing signal of the optical disc is taken out from signals recorded on the optical disc to control the number of rotations of the spindle (motor) so that the rotation synchronizing signal has a fixed period. This rotation synchronizing signal is ordinarily obtained from Eight to Fourteen Modulation (hereinafter simply referred to as EFM) signal or Address In Pregroove (hereinafter simply referred to as ADIP) signal. However, since EFM signal does not exist at the innermost circumferential portion of the recording area of the hybrid media, there are instances where when light spot enters the recording area, the number of disc rotations is not stabilized even in the state where the tracking servo is stable.

This invention has be proposed in view of actual circumstances as described above, and its object is to provide an optical disc adapted for implementation of such a control to suppress oscillation of the tracking servo which is apt to take place when light spot is passed through the boundary between the program area and the recording area to realize tracking servo stable at all times to prevent temporal missing of information, and to stabilize the number of disc rotations at all times, and a recording and/or reproducing apparatus for such optical disc.

DISCLOSURE OF THE INVENTION

An optical disc according to this invention comprises, within a disc surface, a first recording area where data using physical uneven portions are recorded in advance, a second recording area where grooves are formed, and buffering areas where no valid data exists disposed within the respective first and second areas between the first and the second recording areas. Since access is inhibited in such buffering region (areas), both recording and reproduction are not carried out.

Further, an optical disc according to this invention comprises a first recording area where data are recorded by phase pits, a second recording area where grooves are formed and adapted so that data are permitted to be recorded, and a buffering area provided between the first recording area and the second recording area, wherein data are recorded, in predetermined recording units, in the first recording area and the second recording area, and only a pattern for generating tracking error signal is formed in the buffering area.

In this case, the buffering area is an area having a size of multiple of integer of the predetermined recording unit or more. For example, when the predetermined recording unit is assumed to be 1 cluster consisting of 36 sectors each having or consisting of 2352 bytes, it is desirable that the buffering area is 2 clusters or more. At the inner circumferential portion on the disc surface, 2 clusters correspond to substantially 10 tracks, and further correspond to substantially 16 μm in terms of the track width.

In this case, it is preferable that linking sectors for de-interleaving of 2 sectors or more are provided after the last cluster where the last information is recorded of the first recording area. This is carried in consideration of the case where interleaving length in the optical disc is longer than 1 sector of the data format. By providing linking sectors after the last cluster, missing of information is prevented.

Further, a recording and/or reproducing apparatus according to this invention is directed to a recording and/or reproducing apparatus for an optical disc as described above including a first recording area where data are recorded in advance by physical uneven portions, a second recording area where grooves are formed, and a buffering area where access is inhibited, which is provided between the first and second recording areas, wherein the apparatus comprises: an optical head for reading out data from the optical disc, tracking error signal generating means for generating a tracking error signal on the basis of an output signal from the optical head, tracking control means for carrying out tracking control on the basis of the tracking error signal generated by the tracking error signal generating means, amplitude detecting means for detecting amplitude of the tracking error signal generated by the tracking error signal generating means, and control means for controlling the tracking control means on the basis of a detection signal from the amplitude detecting means, whereby the control means is operative to carry out switching of polarity (direction in control) of the tracking control means in dependency upon whether the optical head scans either the first recording area or the second recording area of the optical disc, and to move the optical head in a radial direction of the optical disc in the state where tracking control operation by the tracking control means is turned OFF thereafter to allow the tracking control means to be operative when detection result from the amplitude detecting means indicates that amplitude of the tracking error signal from the tracking error signal generating means falls within a predetermined range.

Further, a recording and/or reproducing apparatus according to this invention is directed to a recording and/or reproducing apparatus for an optical disc including a first recording area where data using physical uneven portions are recorded in advance, a second recording area where grooves are formed, a buffering area provided between the first recording area and the second recording area, and a management area in which management data for carrying out management of data recorded in the first and second recording areas is recorded, wherein the apparatus comprises an optical head for reading out data from the optical disc, and control means for controlling movement operation of the optical head on the basis of the management data which has been read out from the optical head, whereby the control means is operative so that when the optical head moves from any one of the first and second recording areas of the optical disc to the other recording area, it inhibits access to the buffering area of the optical disc.

BEST MODE FOR CARRYING OUT THE INVENTION

Best mode for carrying out an optical disc according to this invention will now be described with reference to the attached drawings. This best mode is directed to a magneto-optical disc so called hybrid media each including, within a single disc surface, a recording area and a program area (premastered area).

Figure 1:
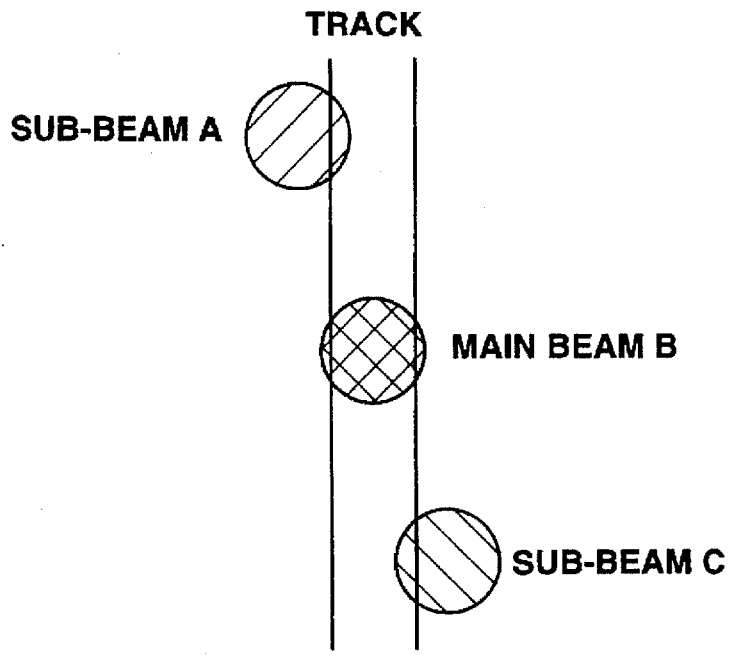
FIG. 1 is a model view showing the state where no tracking error takes place when the three-beam method is used.
Figure 2:
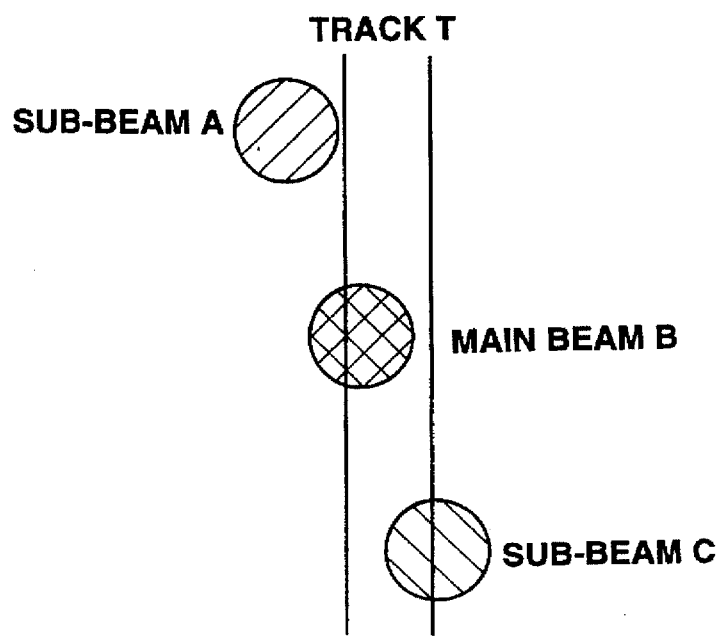
FIG. 2 is a model view showing the state where main beam spot B is slightly shifted to the left side.
Figure 3:
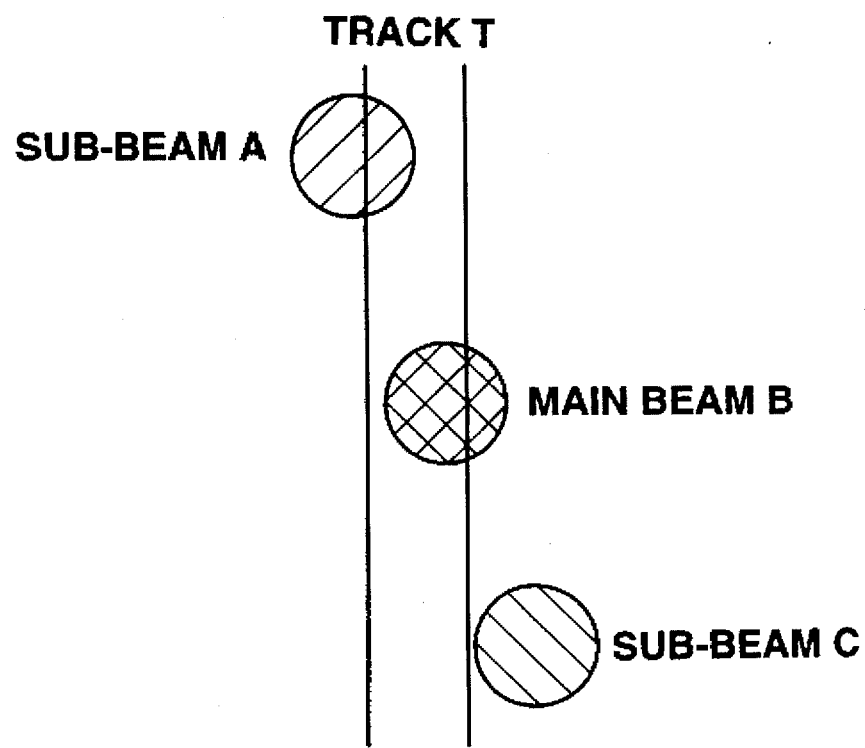
FIG. 3 is a model view showing the state where main beam spot B is slightly shifted to the right side.
Figure 4:
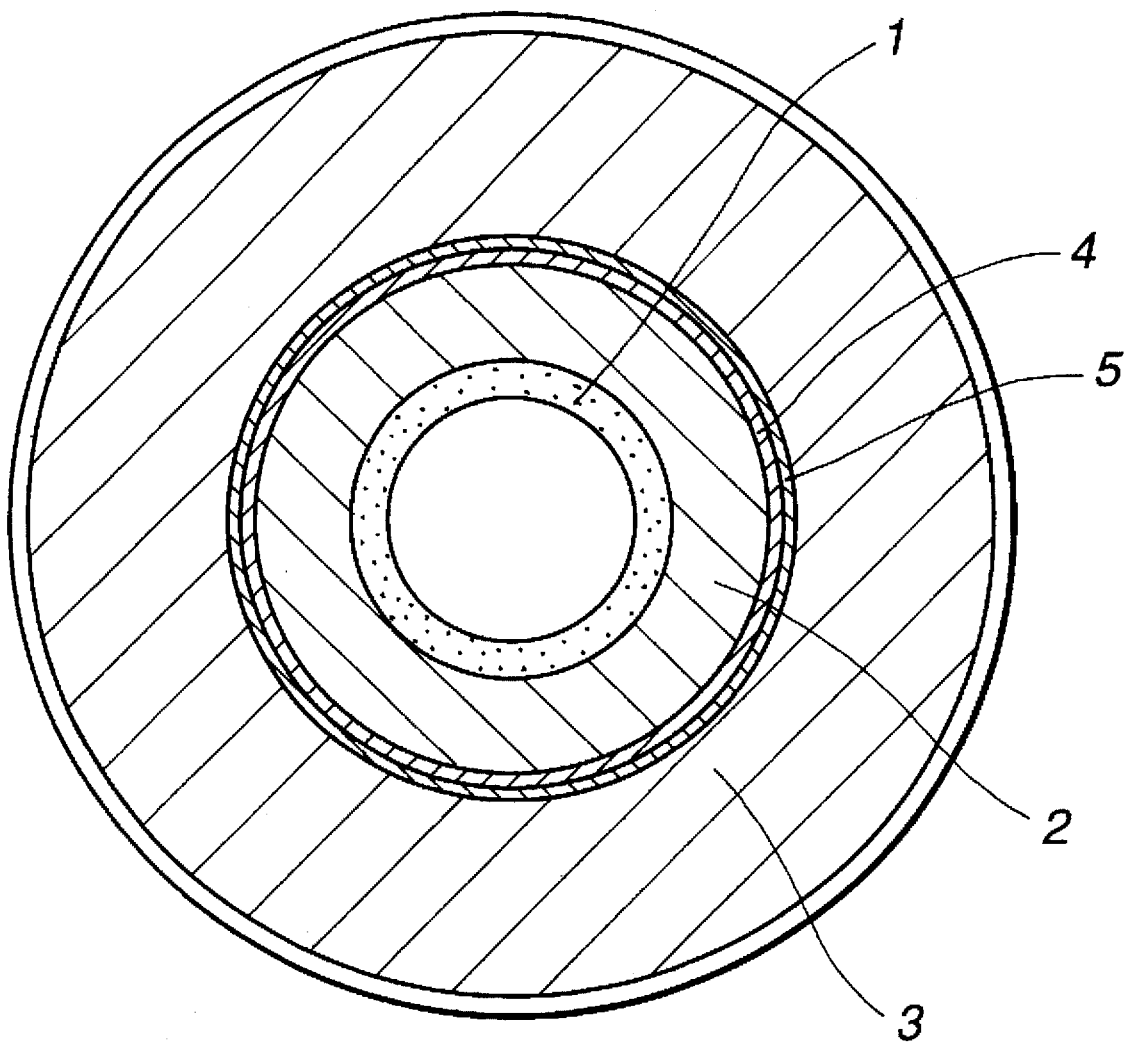
FIG. 4 is a plan view showing, in a model form, a magneto-optical disc which is an embodiment of an optical disc according to this invention.

On the magneto-optical disc, as shown in FIG. 4, there is provided a lead-in area 1 where TOC information corresponding to table of contents of information recorded at the innermost circumferential portion on the disc surface is recorded. At the outer circumferential portion of the lead-in area 1, a program area (premastered area) 2 is provided. Further, at the outer circumferential portion of the program area 2, a recording area 3 which is a recordable area is provided. The program area 2 is caused to be emboss pits, and the recording area 3 is caused to be wide grooves. Particularly, at the boundary between the program area 2 and the recording area 3, buffering area 4, 5 where no valid data exists are respectively provided in the program area 2 and the recording area 3. These respective buffering areas 4, 5 are an access inhibit area, and neither recording nor reproduction is carried out in these areas. Particularly, only pattern for generating tracking error signal is formed. In more practical sense, pattern for generating tracking error signal having the same polarity as polarity of tracking error signal generated in the program area 2 is formed by emboss pits within the buffering area 4. In addition, pattern for generating tracking error signal having the same polarity as polarity of tracking error signal generated in the recording area 3 is formed by grooves within the buffering area 5.

In this case, in more practical sense, it is desirable that the respective buffering areas of the recording area and the program area respectively have the range of 2 clusters or more. In this case, two clusters correspond to substantially 10 tracks on the disc surface, and further correspond to substantially 16 μm in terms of the track width.

Further, it is preferable to provide linking sectors for de-interleaving of 2 sectors or more after the last cluster where last information is recorded of the program area. This is carried out in consideration of the case where interleaving length in the optical disc is longer than one sector of the data format. By providing linking sectors after the last cluster, missing of information is prevented.

Figure 5:
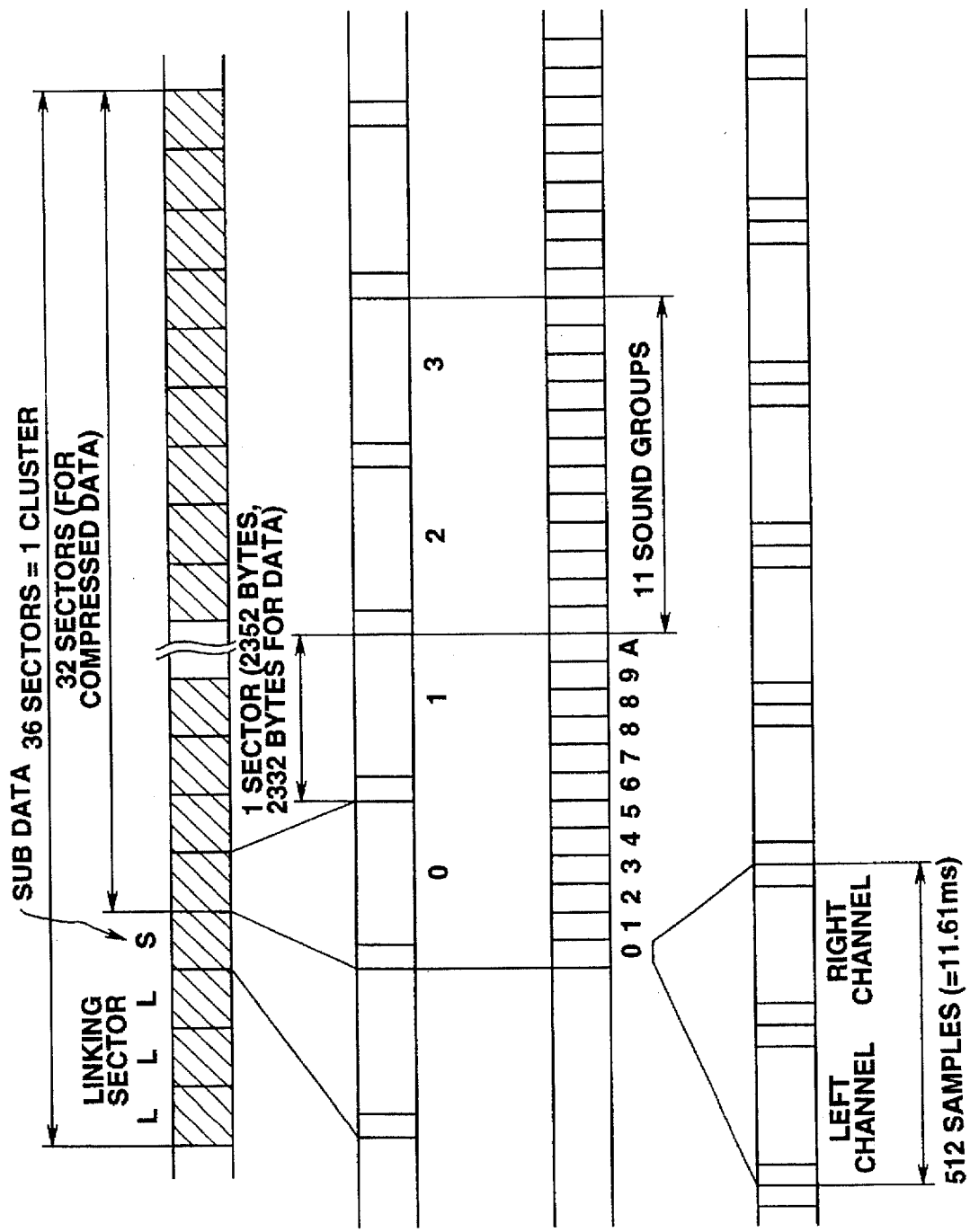
FIG. 5 is a model view showing data format of the magneto-optical disc of the embodiment.

More practical data format of the magneto-optical disc will now be described. In this data format, as shown in FIG. 5, recording is carried out with 36 sectors each having or consisting of 2352 bytes being as one cluster (one block). In this case, three sectors arranged (allocated) at the leading portion are used as linking sector L.

In the magneto-optical disc, in the case where Advanced Cross Interleave Reed-Solomon Code (ACIRC) is employed as interleaving therefor, this interleaving length is 108 frames. However, when one sector of the magneto-optical disc is, e.g., 98 frames, it is necessary to provide linking sectors of 108 frames or more before and after data is written onto such disc in order to complete error correction. Namely, if information of 5 sectors in total of respective 2 sectors before and after and own 1 sector exist at the minimum in order to read out one sector, reproduction cannot be carried out. Accordingly, it is necessary to provide linking sectors for de-interleaving of 2 sectors or more after the last cluster where last information is recorded of the program area 2.

In this embodiment, since 4 sectors of 36 sectors of one cluster are used for linking sectors L and sub sector S, recording of information is carried out such that writing is started from the middle portion of the second linking sector L, and error correction is completed by using up to the portion in the middle of the second sector of the linking sectors L positioned at the leading portion of the next cluster with respect to the last protruded portion. It is to be noted that, in the reproduction only optical disc, the linking sectors L are used for sub data.

The remaining 32 sectors of 36 sectors of one cluster consist of compressed audio data, and bytes for data of 2352 bytes of one sector are 2332 bytes. One unit consisting of 424 bytes of compressed audio data is called one sound group. In this embodiment, rates of the sound groups are caused to be in correspondence with each other in such a manner that 11 sound groups are caused to correspond to 2 sectors, and the remaining respective one sound groups are sequentially transmitted and processed. Namely, in the first one sector, left and right channels×5 sound groups and left channel of the sixth sound group are recorded, and left and right channels of 5 sound groups are recorded subsequently to the right channel of one sound group are then recorded.

It is to be noted that when compression of one sound group is released, information corresponding to 11.62 m sec. of 512 samples of the left and right channels is provided.

In the above-mentioned magneto-optical disc, at the boundary between the program area 2 and the recording area 3, buffering areas 4, 5 where no valid data exists are respectively provided in the program area 2 and the recording area 3. Namely, even in the case where inversion takes place in phase of the tracking error signal when the optical pick-up is passed through the boundary between the program area 2 and the recording area 3, there is no possibility that sudden phase inversion may take place because light spot moves from the program area 2 to the recording area 3 through the respective buffer areas 4, 5. Accordingly, oscillation of the tracking servo which is apt to take place in hybrid media is suppressed. Thus, stable tracking error signal can be obtained at all times.

Moreover, since buffer areas 4, 5 exist when light spot moves from the program area 2 to the recording area 3, the number of disc rotations can be stabilized.

Namely, in accordance with the optical disc according to this invention, oscillation of the tracking servo which is apt to take place when light spot is passed through the boundary between the program area and the recording area is suppressed to realize stable tracking servo at all times. Thus, temporary missing of information can be prevented and the number of disc rotations can be stabilized.

Figure 6:
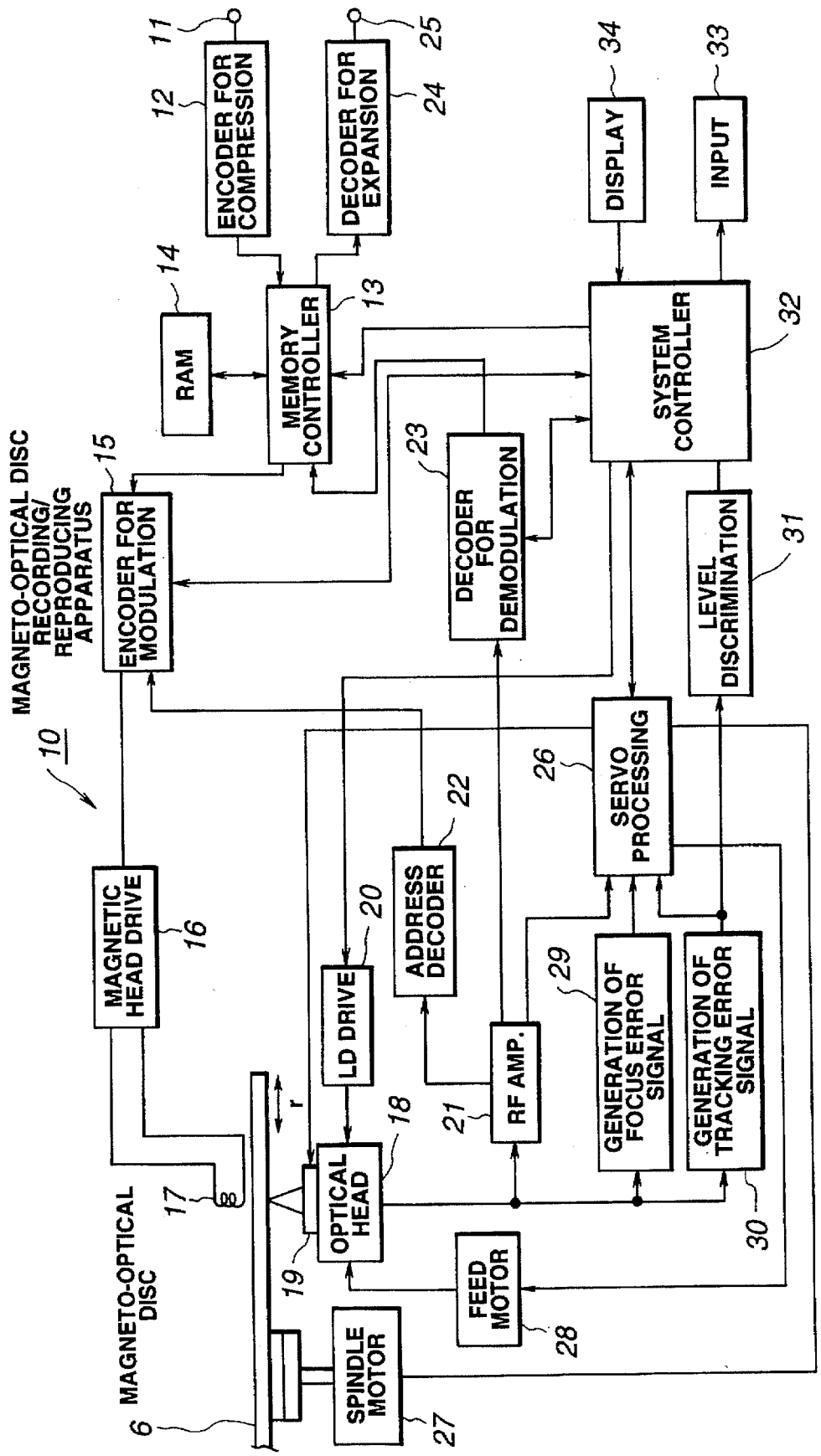
FIG. 6 is a block diagram showing outline of a magneto-optical disc recording/reproducing apparatus which is an embodiment of a recording and/or reproducing apparatus according to this invention.

The best mode for carrying out a recording and/or reproducing apparatus according to this invention will now be described with reference to the attached drawings. This best mode is directed to a magneto-optical disc recording/reproducing apparatus 10 as shown in FIG. 6 adapted for implementing recording and/or reproducing processing to the above-described magneto-optical disc shown in FIG. 4, i.e., magneto-optical disc provided with program area 2 where data are recorded in advance by emboss pits which are physical uneven portions, recording area 3 where grooves are formed, and buffering areas 4, 5 provided between the program area 2 and the recording area 3 and adapted so that access is inhibited.

This magneto-optical disc recording/reproducing apparatus 10 comprises an optical head 18 for reading out data from magneto-optical disc 6, a tracking error signal generating circuit 30 for generating a tracking error signal on the basis of an output signal from the optical head 18, a servo processing circuit 26 for driving, in radial direction r of the magneto-optical disc 6, by a bi-axial actuator 19, object lens which will be described later of the optical head 18 on the basis of the tracking error signal generated by the tracking error signal generating circuit 30, a level discriminating circuit 31 for detecting level of the tracking error signal generated by the tracking error signal generating circuit 30, and a system controller 32 for controlling the servo processing circuit 26 on the basis of a detection signal from the level discriminating circuit 31.

This magneto-optical disc recording/reproducing apparatus 10 implements recording and/or reproduction processing to data of the magneto-optical disc 6 rotationally driven by a spindle motor 27. At the time of recording data with respect to the magneto-optical disc 6, this apparatus applies, by a magnetic head 17, modulation magnetic field corresponding to recording data in the state where laser beams are irradiated onto the magneto-optical disc 6 by the optical head 18 to thereby carry out so called magnetic field modulation recording to record data into grooves of the recording area 3 of the magneto-optical disc 6. On the other hand, at the time of reproduction, this apparatus traces grooves of the magneto-optical disc 6 by laser beams by using the optical head 18 to carry out reproduction.

Figure 7:
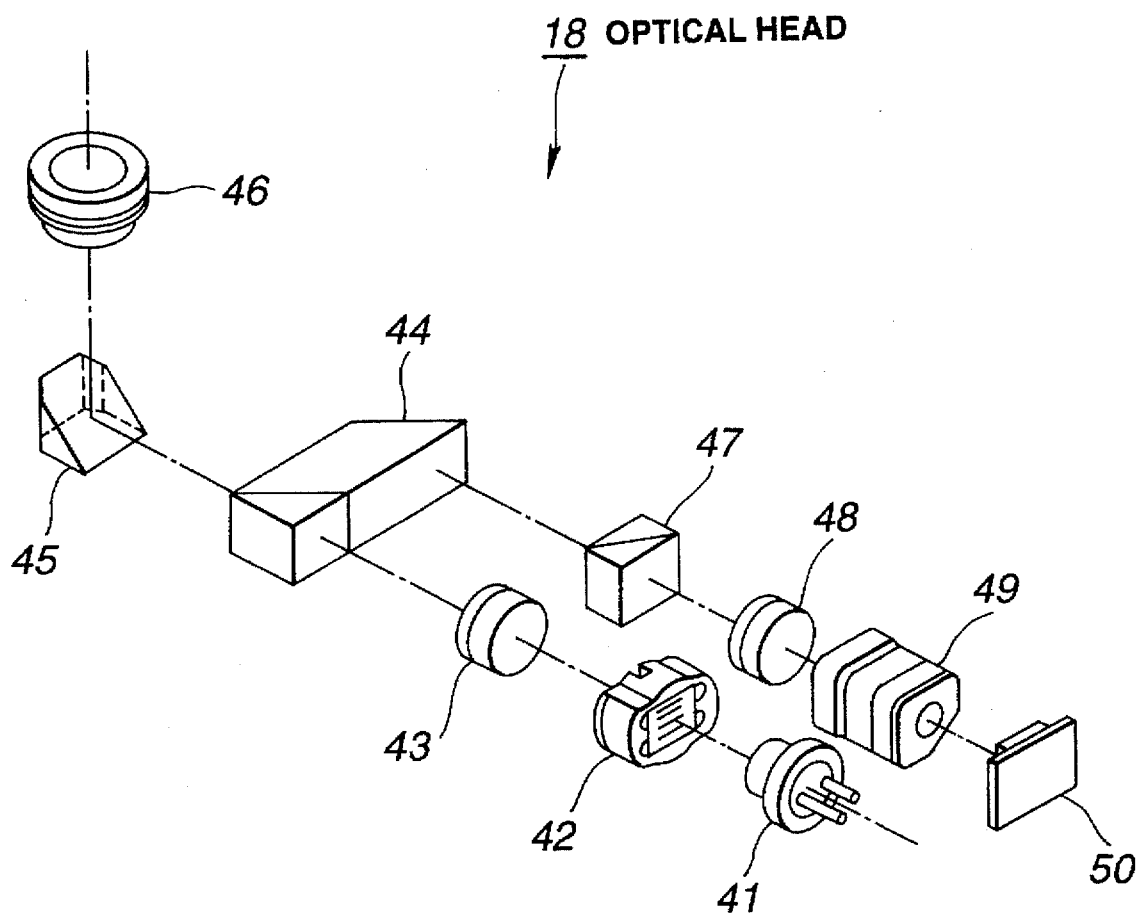
FIG. 7 is an exploded perspective view showing the configuration of optical head of the magneto-optical disc recording/reproducing apparatus.

In this embodiment, the optical head 18 is of a structure as shown in FIG. 7. When the case where a magneto-optical signal is read out from the recording area 3 of the magneto-optical disc 6 is taken as an example, laser beams emitted from a laser diode 41 serving as a light source are caused to be three beams by a grating 42. These three beams are caused to be parallel beams by a collimator lens 43, and are then incident to a beam splitter 44. The beam splitter 44 allows the laser beams to be transmitted therethrough. The parallel laser beams which have been transmitted through the beam splitter 44 are caused to undergo change of traveling direction (optical path) by 90 degrees by a rising mirror 45, and are reached to object lens 46. The object lens 46 converges the parallel laser beams to irradiate them into the recording area 3 of the magneto-optical disc 6.

Reflected laser beams from the recording area 3 on the magneto-optical disc 6 are caused to be parallel beams for a second time by the object lens 46, and are reflected by the beam splitter 44. The reflected light thus obtained is guided to a photodetector 50 which is light detector through a Wollaston prism 47, a collimator lens 48 and a multi-lens 49.

The optical head 18 is provided at the position opposite to the magnetic head 17 through the magneto-optical disc 6. In the case of writing data onto the magneto-optical disc 6, the magnetic head 17 is driven by a magnetic head drive circuit 16 to apply modulation magnetic head corresponding to recording data, and to irradiate laser beams onto the target track of the recording area 3 of the magneto-optical disc 6 by the optical head 18 to thereby record data by the magnetic field modulation system. Moreover, this optical head 18 detects reflected light of laser beams irradiated onto the target track by using the photodetector 50 to deliver it to a focus error signal generating circuit 29 and the tracking error signal generating circuit 30.

Further, in the case of reproducing data from the magneto-optical disc 6, the optical head 18 delivers a detection signal detected at the photodetector 50 to the focus error signal generating circuit 29 and the tracking error signal generating means 30, and detects differences between light quantities and polarization angles (Kerr rotational angles) of rays of reflected light from the program area 2 and the recording area of the laser beams to generate reproduction signals.

Namely, this magneto-optical disc recording/reproducing apparatus 10 converges laser beams for reproduction and writing, which are outputted from the laser diode 41 serving as light source of the optical head 18, and are caused to be through optical elements such as grating 42, collimator lens 43, beam splitter 44, etc. into the program area 2 and the recording area 3 of the magneto-optical disc 6 through the object lens 46 of which focus direction and tracking direction are subjected to drive control by the bi-axial actuator 19.

In the case of recording data onto the magneto-optical disc 6, the magneto-optical disc recording/reproducing apparatus 10 drives the laser diode 41 through a LD driving circuit 20 by control of the system controller 32 to allow the laser diode 41 to emit high output laser beams for writing therefrom. The writing high output laser beams emitted from the laser diode 41 are irradiated onto the target track of the recording area 3 of the magneto-optical disc 6 by the object lens 46 of which focus direction and track direction are driven and controlled by the bi-axial actuator 19. At the back side of the target track of the recording area 3 of the magneto-optical disc 6 onto which the writing laser beams have been irradiated, the magnetic head 17 is positioned. The magnetic head 17 is driven by the magnetic head drive circuit 16 to record recording data obtained by modulating information signal at the position where the writing laser beams have been irradiated. The magnetic head drive circuit 16 receives modulated data for recording from an encoder 15 for modulation. The modulation encoder 15 adds, e.g., error correction code by the ACIR system to compressed data compressed at an encoder 12 for compression to modulate it by the Eight to Fourteen Modulation (EFM) system thereafter to deliver it to the magnetic head drive circuit 16. In this case, error correction of the ACIR system is a system of apply Add-on Interleave (processing) only to data with respect to CIR to implement sequencing to data on the disc so that they are in order of real times to interleave only parity of error correction. For this reason, modulation magnetic filed corresponding to EFM recording data is recorded into the target track to which high output laser beams are irradiated from the optical head 18 of the recording area 3 of the magnet-optical disc 6 by the magnetic head 17.

On the other hand, in the case of reproducing data from the magneto-optical disc 6, the magneto-optical disc recording/reproducing apparatus 10 drives the laser diode 41 through the LD drive circuit 20 by control of the system controller 32 to allow the laser diode 41 to emit lower output laser beams for reproduction therefrom. The lower output laser beams for reproduction which have been emitted from the laser diode 41 are irradiated onto the target track of the program area 2 and the recording area 3 of the magneto-optical disc 6 by the object lens 46 of which focus direction and the track direction are driven and controlled by the bi-axial actuator 19. Reflected laser beams from the program area 2 and the recording area 3 of the magneto-optical disc 6 are guided to the photodetector 50 which is the light detector within the optical head 18, and are irradiated thereonto.

A portion of reproduction signal obtained at the photodetector 50 is caused to be RF signal by a RF amplifier 21 and is delivered to an address decoder 22, a decoder 23 for demodulation and the servo processing circuit 26.

The address decoder 22 demodulates cluster, sector address information called, e.g., ADIP (Address In Pregroove) signal from the RF signal to deliver it to the encoder 15 for modulation.

The decoder 23 for demodulation implements error correction processing of the ACIRC system and the EFM data demodulation processing to the RF data.

The servo processing circuit 26 controls the spindle motor 27 for rotationally driving the magneto-optical disc 6 in accordance with the RF signal. Moreover, the servo processing circuit 26 controls a feed motor 28 in accordance with the RF signal to move the optical head 18 and magnetic head 17 to the target track position of the magneto-optical disc 6. This servo processing circuit 26 is also supplied with focus error signal and tracking error signal from the focus error signal generating circuit 29 and the tracking error signal generating circuit 30.

In this case, demodulated data from the decoder 23 for demodulation is outputted to a decoder 24 for expansion while being stored into an external RAM 14 by control of a memory controller 13. For example, in the case where 1M bit DRAM is used as the external RAM 14, data corresponding to about 3 sec. can be stored. Thus, even in the case where reproduction data from the magneto-optical disc 6 is interrupted by vibration, etc., such reproduction data can be compensated by data stored in the external RAM 14. Thus, sound jump for a time period until correct data is reproduced can be prevented. The decoder 24 for expansion expands the data which has been read out from the external RAM 14 by control of the memory controller 13 to output it from an output terminal 25.

The remaining portion of the reproduction signal which has been obtained at the photodetector 50 is delivered to the focus error signal detecting circuit 29 and the tracking error signal detecting circuit 30. A focus error signal and a tracking error signal that the focus error signal detecting circuit 29 and the tracking error signal detecting circuit 30 have respectively detected are delivered to the servo processing circuit 26. The servo processing circuit 26 delivers a focus servo signal and a tracking servo signal to the bi-axial actuator 19 in accordance with the focus error signal and the tracking error signal to drive the object lens 46 in the focus direction and in the track direction.

In this case, the tracking error signal obtained at the tracking error signal detecting circuit 30 is also delivered to the level discriminating circuit 31 in addition to the servo processing circuit 26.

The level discriminating circuit 31 informs the system controller 32 as to whether or not the optical head 18 scans the program area 2 or the recording area 3 at present by detecting level of the tracking error signal in the respective areas. Level of the tracking error signal in the program area 2 where emboss pits are formed and that in the recording area 3 where grooves are formed are different. The level of the tracking error signal of the recording area 3 is about twice grater than the level of the tracking error signal of the program area 2. Accordingly, the level discriminating circuit 31 is operative so that in the case where it discriminates that current tracking error signal is the tracking error signal of the program area 2, it outputs signal of LOW level to the system controller 32. In contrast, the level discriminating circuit 31 is operative so that in the case where it discriminates that current tracking error signal is the tracking error signal of the recording area 3, it outputs a signal of HIGH level to the system controller 32.

The system controller 32 can judge, by change in the signal of LOW level, or HIGH level delivered from the level discriminating circuit 31, whether the optical head 18 moves from the inner circumference to the outer circumference of the magneto-optical disc 6, or moves from the outer circumference to the inner circumference thereof. Namely, if the signal changes from LOW level to HIGH level, it can be judged that the optical head 18 moves from the inner circumference to the outer circumference. In contrast, if the signal changes from HIGH level to LOW level, it can be judged that the optical head 18 moves from the outer circumference to the inner circumference.

Moreover, the system controller 32 switches, in dependency upon whether the optical head 18 scans either the program area 2 or the recording area 3 of the magneto-optical disc 6, polarity (direction) of the tracking control that the servo processing circuit 26 carries out. This is to cope with the case where when the optical pick-up 18 is passed through the boundary between the program area 2 and the recording area 3, inversion takes place in the phase of the tracking error signal.

The system controller 32 allows the tracking control operation at the servo processing circuit 26 to be turned OFF thereafter to move the optical head 18 in the radial direction r of the magneto-optical disc 6. Further, when the level discriminating circuit 31 discriminates that level of the tracking error signal falls within a predetermined range, the system controller 32 allows the servo processing circuit 26 to carry out the tracking control.

Namely, the system controller 32 is operative so that in the case where it judges from level discrimination result of the level discriminating circuit 31 that the optical head 18 scans the program area 2 and the recording area 3 at present, it allows the servo processing circuit 26 to carry out tracking control operation.

Moreover, the system controller 32 is operative so that it judges from level discrimination result of the level discriminating circuit 31 that the optical head 18 does not scan the program area 2 and the recording area 3 at present, it controls drive of the feed motor 28 through the servo processing circuit 26 to move scanning point of the optical head 18 in the radial direction r.

In this case, consideration is made in connection with the case where, as the magneto-optical disc 6, there is used magneto-optical disc provided with a management area for recording management data which carries out management of data recorded in the program area 2 and the recording area 3 in addition to the program area 2, the recording area 3 and buffering areas 4, 5. In this case, the system controller 32 is operative so that when the optical head 18 moves from any one of the program area 2 and the recording area 3 of the magneto-optical disc 6 to the other area, it inhibits access to the buffering areas 4, 5 of the magneto-optical disc 6. Moreover, the system controller 32 stops, in the buffering areas 4, 5, tracking control at the servo processing circuit 26 on the basis of management data which has been read out from the magneto-optical disc 6.

Moreover, a key input operation section 33 and a display section 34 are connected to the system controller 32. This system controller 32 carries out control of the recording system and the reproducing system in the operation mode designated by operation input information by the key input operation section 33. Further, the system controller 32 allows the display section 34 to display bit compression mode on the basis of bit compression mode information at the encoder 12 for compression which has been caused to undergo selective switching by the key input operation section 33, or bit compression mode information within reproduction data obtained through the reproducing system from the RF amplifier 21, and displays reproduction time on the display section 34 on the basis of data compression rate in the bit compression mode and reproduction position information on the recording track.

As described above, in accordance with the magneto-optical disc recording/reproducing apparatus 10, even in the case where inversion takes place in the phase of the tracking error signal when the optical pick-up 18 is passed through the boundary between the program area 2 and the recording area 3, polarity (direction) of the tracking control of the servo processing circuit 26 is switched by the level discriminating circuit 31 and the system controller 32. Further, when the optical head 18 is caused to be accessed, tracking servo is carried out after level of the tracking error signal is discriminated without allowing the servo processing circuit 26 to immediately start tracking control. Accordingly, oscillation can be suppressed. In addition, without accessing the optical pick-up 18 thereafter to allow the servo processing circuit 26 to immediately complete the tracking control, tracking control is completed after the level of the tracking error signal becomes steady (stable). Accordingly, oscillation can be suppressed.

Namely, in accordance with the recording and/or reproducing apparatus according to this invention, since oscillation of the tracking servo can be suppressed, stable tracking can be realized at all times, and temporal missing of information signal can be prevented.

What is claimed is:

1. An optical disc including:
    a first recording area where data using physical uneven portions are recorded in advance;
    a second recording area where grooves are formed; and
    a buffering area provided between the first recording area and the second recording area, wherein only a pattern for generating a tracking error signal is formed in the buffering area.

2. An optical disc as set forth in claim 1,
    wherein the buffering area is formed by physical uneven portions.

3. An optical disc as set forth in claim 1,
    wherein the buffering area is composed of a first buffering area formed by physical uneven portions, and a second buffering area where grooves are formed.

4. An optical disc including:
    a first recording area where data using phase pits are recorded in advance;
    a second recording area where a plurality of grooves are formed and adapted so that said grooves are suitable for recording data therewithin; and
    a buffering area provided between the first recording area and the second recording area,
    wherein data are recorded, in predetermined recording units, in the first and second recording areas, and only a pattern for generating a tracking error signal is formed in the buffering area.

5. An optical disc as set forth in claim 4,
    wherein a pattern for generating a tracking error signal having the same polarity as polarity of a tracking error signal generated in the first recording area and a pattern for generating a tracking error signal having the same polarity as polarity of a tracking error signal generated in the second area are formed in the buffering area.

6. An optical disc as set forth in claim 4,
    wherein the buffering area is comprised of an area formed physical uneven portions.

7. An optical disc as set forth in claim 4, wherein the buffering area is composed of a first buffering area formed by using physical uneven portions, and a second buffering area where grooves are formed.

8. An optical disc as set forth in claim 4, wherein the buffering area is an area having size of at least a multiple of integer of the predetermined recording unit.

9. An optical disc as set forth in claim 4, wherein the predetermined recording unit consists of plural linking sectors and plural data sectors where data are recorded, linking sectors of at least 2 sectors being provided after the last recording point of the first recording area.

10. A recording and/or reproducing apparatus for an optical disc including a first recording area where data are recorded in advance by physical uneven portions, a second recording area where grooves are formed, and a buffering area provided between the first and second recording areas and adapted so that access is inhibited therewithin, the apparatus comprising:

an optical head for reading out data from the optical disc;

tracking error signal generating means for generating a tracking error signal on the basis of an output signal from the optical head;

tracking control means for carrying out tracking control on the basis of the tracking error signal generated by the tracking error signal generating means;

amplitude detecting means for detecting amplitude of the tracking error signal generated by the tracking error signal generating means; and control means for controlling the tracking control means on the basis of a detection signal from the amplitude detecting means, whereby the control means is operative to switch polarity (direction in control) of the tracking control means in dependency upon whether the optical head scans either the first recording area or the second recording area, and to move the optical head in a radial direction of the optical disc in the state where tracking control operation by the tracking control means is turned off thereafter to allow the tracking control means to be operative when detection result from the amplitude detecting means indicates that amplitude of the tracking error signal from the tracking error signal generating means falls within a predetermined range.

11. A recording and/or reproducing apparatus as set forth in claim 10, wherein the control means is operative so that when detection result by the amplitude detecting means indicates that amplitude of the tracking error signal from the tracking error signal generating means is level substantially equal to level of a tracking error signal of either the first recording area or the second recording area, it switches the tracking control means so that the tracking control means is placed in operative state.

12. A recording and/or reproducing apparatus as set forth in claim 10, wherein the control means is operative so that when detection result by the amplitude detecting means indicates that amplitude of the tracking error signal from the tracking error signal generating means is amplitude different from amplitude of a tracking error signal of either the first recording area or the second recording area it moves a scanning point on the optical disc by the optical head in a radial direction of the optical disc.

13. A recording and/or reproducing apparatus for an optical disc including a first recording area where data using physical uneven portions are recorded in advance, a second recording area where grooves are formed, a buffering area provided between the first and second recording areas, and a management area in which management data for carrying out management of data recorded in the first and second recording areas is recorded, the apparatus comprising:

an optical head for reading out data from the optical disc; and first control means for controlling movement operation of the optical head on the basis of the management data which has been read out from the optical head, whereby the first control means is operative so that when the optical head moves from the first recording area to the second recording area of the optical disc the first control means inhibits access to the buffering area of the optical disc, and when the optical head moves from the second recording area to the first recording area of the optical disc the first control means inhibits access to the buffering area of the optical disc.

14. A recording and/or reproducing apparatus as set forth in claim 13, wherein the apparatus further comprises tracking control means (second control means) for carrying out tracking control by using a tracking error signal generated on the basis of an output signal form the optical head, the first control means being operative to stop, in the buffering area of the optical disc, operation of the tracking control means on the basis of the management data which has been read out from the optical disc.

* * * * *